United States Patent [19]

Schulte-Elte

[11] 3,892,809

[45] July 1, 1975

[54] PROCESS FOR THE PREPARATION OF BUTENOYL 1,3-CYCLOHEXADIENES

[75] Inventor: Karl-Heinrich Schulte-Elte, Onex, Geneva, Switzerland

[73] Assignee: Firmenich S.A., Geneva, Switzerland

[22] Filed: Sept. 11, 1972

[21] Appl. No.: 287,647

[30] Foreign Application Priority Data
Sept. 13, 1971 Switzerland.................... 13397/71

[52] U.S. Cl.......... 260/586 R; 204/158 R; 252/522; 260/348 C; 260/348.5 L; 260/488 R; 260/617 R; 260/631 R; 426/175; 131/17 R
[51] Int. Cl....................... C07c 45/00; C07c 49/45
[58] Field of Search.......................... 260/586 R, 587

[56] References Cited
UNITED STATES PATENTS
3,354,218   11/1967   Surmatis .......................... 260/586 R
3,400,158   9/1968   Roberts ............................. 260/587
3,436,421   4/1969   Rowland ............................ 260/587

*Primary Examiner*—Howard T. Mars
*Assistant Examiner*—Norman Morgenstern
*Attorney, Agent, or Firm*—Pennie & Edmonds

[57] ABSTRACT

Process for the preparation of oxygenated unsaturated cycloaliphatic compounds useful as perfuming and odour-modifying agents in the manufacture of perfumes and perfumed products, and as flavouring and taste-modifying agents in the aromatization of foodstuffs in general and imitation flavours for foodstuffs, beverages, animal feeds, pharmaceutical preparations and tobacco products.

Composition of matter relating to some of said oxygenated unsaturated cycloaliphatic compounds which are new and perfume- and flavouring compositions containing same.

2 Claims, No Drawings

PROCESS FOR THE PREPARATION OF BUTENOYL 1,3-CYCLOHEXADIENES

SUMMARY OF THE INVENTION

The compounds to which the present invention relates have the partial formula

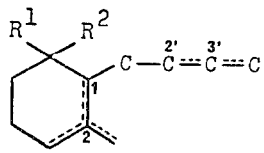

possessing a saturated or mono-unsaturated side chain and wherein the dotted lines represent a double bond in said side chain and a double bond in the ring. For simplicity in referring to the various compounds of the invention, their derivatives or precursors, the following nomenclature is used throughout this specification to define the nature of the side chain:

- $a$: double bond in position $2'$
- $b$: double bond in position $3'$
- $c$: saturated side chain The above system of nomenclature will be appended to the numbers designating the various formulae given hereinafter, to show the position of the double bonds where they may occupy more than one position.

The invention relates to a new process for the preparation of oxygenated cycloaliphatic compounds having the formula

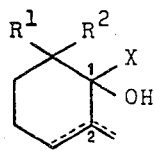 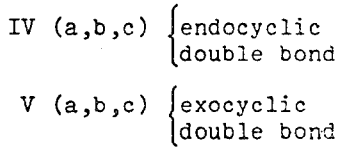

IV (a,b,c) {endocyclic double bond}

V (a,b,c) {exocyclic double bond} containing an exo- or endocyclic double bond in one of the positions indicated by the dotted lines and wherein $R^1$ and $R^2$ are the same or different and each represents a hydrogen atom or a lower alkyl radical comprising from one to six carbon atoms, X represents a univalent radical of formula

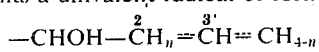

comprising a double bond in one of the positions indicated by the dotted lines and wherein $n$ is 1 or 2, or formula $$-CHOH-CH_2-CH_2-CH_3;$$

and/or formula

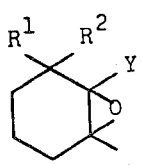   VI (a,b,c)

wherein the substituents $R^1$ and $R^2$ have the meaning indicated above, and the symbol Y represents a univalent radical of formula

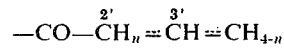

containing a double bond in one of the positions indicated by the dotted lines and wherein $n$ is 1 or 2, or formula $$-CO-CH_2-CH_2-CH_3,$$

which process comprises

I.
a. oxidizing an alcohol of formula

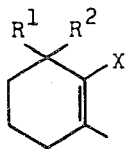   VII (a,b,c)

by means of singlet oxygen, and b. successively treating the thus obtained oxidation products with a reducing agent to yield a mixture containing the compounds of formula IV (a,b,c), V (a,b,c) and VI (a,b,c);

or

II.

epoxidizing a compound of formula VII (a,b,c) and successively treating the thus obtained epoxide with a basic agent to yield a compound of formula V (a,b,c).

The above mentioned compounds of formula IV (a,b,c), V (a,b,c) and VI (a,b,c), most of which are new, possess interesting organoleptic properties and, moreover, may be used as intermediates for the preparation of other compounds having useful fragrant and flavouring properties.

It is in fact a further object of the present invention to prepare unsaturated cycloaliphatic ketones of formula

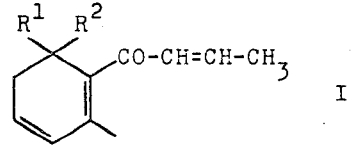   I whose class includes a compound wherein each of the substituents $R^1$ and $R^2$ represents a methyl radical, which compound is better known by the name of "β-damascenone" [cf. e.g.: Helv. Chim. Acta, 53, 541 (1970)]. Said process comprises treating a keto-alcohol of formula

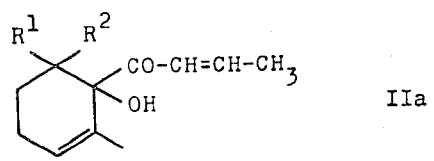   IIa with an acidic agent.

A further object of the present invention is to provide a process for preparing keto-alcohols of formula

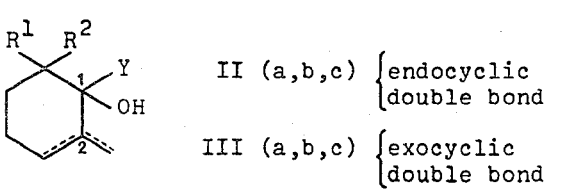

II (a,b,c) {endocyclic double bond}

III (a,b,c) {exocyclic double bond} containing a double bond in one of the positions indicated by the dotted lines and wherein the symbol Y has the same meaning as that indicated for formula VI (a,b,c), which process comprises oxidizing a diol of formula IV (a,b,c) or V (a,b,c).

BACKGROUND OF THE INVENTION

One of the main objects of the aromatization of foodstuffs for instance is to restore the original quality and nature of the flavour, aroma and taste of a given foodstuff material. Very often in fact the organoleptic properties of foodstuffs particularly diminish or are somehow modified in the course of the processes of freezing and storage, or during the modifications, such as cooking or baking, to which the foodstuffs are subjected in order to yield an edible material.

In the past the aromatization was mainly achieved by using materials of natural origin. Nowadays, however, synthetic chemical compounds are used at an ever increasing rate. Said compounds possess the advantage of being available very often in unlimited quantities and at prices lower than those of the natural materials. Moreover, due to the fact that the flavouring character of a natural material is the result of the overall effect determined by the combination and interaction of each of its constituents, the effects achieved by said natural material are very often not as well reproducible as those obtained by the use of the pure synthetic compounds.

In the field of perfumery the man in the art has to solve a similar problem in attempting to reconstitute the olfactive notes of certain natural essential oils or extracts. The perfumer's creativity however is continually boosted by the finding of new synthetic compounds, the organoleptic properties of which will enable him to introduce unprecedented olfactive characters or nuances into new phantasy perfume compositions.

As a consequence, the problem that the chemical industry has to solve is to satisfy the increasing demand of organoleptically interesting chemicals in order to better suit the specific needs of flavourists and perfumers.

The process of the present invention provides a novel and technically original solution to the problem set by the synthesis of unsaturated cycloaliphatic ketones of formula

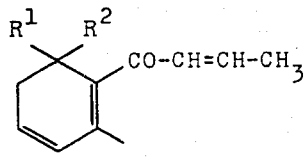

I

These compounds have been prepared in the past by dehydrogenation of a cyclohexenic ketone to afford the corresponding cyclohexadienic derivative [Swiss Pat. No. 505,773].

The above indicated method has the disadvantage of
i. affording the desired compounds only in poor yield and
ii. using non easily accessible starting materials.

The process of the present invention does not offer the said disadvantages and, as a consequence, it can be conveniently exploited by the chemical industry.

Furthermore, the present invention describes the preparation of a new class of cycloaliphatic derivatives, the specific organoleptic properties of which enable the man in the art to further enlarge the choice of products to his disposal.

PREFERRED EMBODIMENTS OF THE INVENTION

As mentioned above, according to the invention the compounds of formula IV (a,b,c), V (a,b,c) and VI (a,b,c) are prepared by oxidizing by means of singlet oxygen an alcohol of formula VII (a,b,c) and successively treating the thus obtained oxidation products with a reducing agent.

Singlet oxygen may be obtained by several known methods [see for instance Accounts of Chem. Research I, 104 (1968)]. A preferred method comprises irradiating triplet oxygen, i.e., molecular oxygen, either pure or in admixture with an inert gas, by means of actinic radiations and in the presence of an energy transfer sensitiser. Inert gases such as for intance helium, argon or nitrogen can be used in the above process. Conventional mercury or sodium vapour arcs can be used as sources of actinic radiations for irradiation purposes. Mercury vapour arcs are preferred since, under the action of their radiations, the oxidation reaction proceeds more uniformly and, consequently, higher yields of the desired oxidation product can be obtained.

As energy-transfer sensitisers, most current sensitisers such as for instance porphyrines, methylene blue, eosine, chlorophyll, 3',4',5',6'-tetrachloro-2,4,5,7-tetraiodofluorescein (the sodium salt of which is called Rose-Bengale), xanthene and dinaphtylenethiophene can be used. For economic reasons, Rose-Bengale is preferred.

The oxidation by means of singlet oxygen according to the process of the invention can take place in the presence of an organic solvent which is stable to actinic irradiation, for instance an aliphatic or cycloaliphatic hydrocarbon such as hexane, octane or cyclohexane, or an aromatic hydrocarbon such as benzene, toluene or xylene, or an alcohol such as methanol, ethanol, propanol, butanol, isopropanol, sec-butanol or tert-butanol, or an ester such as ethyl acetate, butyl acetate and amyl acetate. A mixture of at least two of the above solvents can also be used. For best results it is preferable that all reagents be easily soluble in the solvent medium used. Methanol, ethanol or mixtures of these alcohols with benzene, toluene or ethyl acetate are preferably used.

The temperature at which the oxidation can be carried out can vary between wide limits. For simplicity and economy it is convenient to operate the oxidation between approximately −50° and +50° C. However, at the lower temperatures of this range the formation of the products is slower and at the higher temperatures undesirable side reactions may occur. Consequently, preferred reaction temperatures are comprises between about 0° and 20° C or between about 10° and 20° C.

An alkali metal sulfite, hydrogen sulfite, thiosulfate, dithionate or pyrosulfite in aqueous solution may be advantageously used as reducing agent. Sodium sulfite is however preferred.

In accordance with the hereinabove described process, there is obtained a mixture comprising the compounds of formula IV (*a,b,c*), V (*a,b,c*) and VI (*a,b,c*), which compounds may be separated by means of preparative vapour phase chromatography, or fractional distillation. In this latter case spinning band columns may be conveniently used.

The alcohols of formula VII (*a,b,c*) used as starting materials in the above process of the invention may be prepared according to the procedure described in German Offenlegungsschrift No. 2,022,216. Alcohols VII (*a,b,c*) include 2,6,6-trimethyl-1-[1-hydroxy-butyl]-cyclohex-1-ene which is a new compound.

The compounds of formula IV (*a,b,c*), V (*a,b,c*) and VI (*a,b,c*) include the following new compounds:
  cis- and trans-2,6,6-trimethyl-1-hydroxy-1-[1-hydroxy-but-2-enyl]-cyclohex-2-ene,
  2,6,6-trimethyl-1-hydroxy-1-[1-hydroxy-but-3-enyl]-cyclohex-2-ene,
  2,6,6-trimethyl-1-hydroxy-1-[1-hydroxy-butyl]-cyclohex-2-ene,
  cis- and trans-2-methylene-6,6-dimethyl-1-hydroxy-1-[1-hydroxy-but-2-enyl]-cyclohexane,
  2-methylene-6,6-dimethyl-1-hydroxy-1-[1-hydroxy-but-3-enyl]-cyclohexane,
  2-methylene-6,6-dimethyl-1-hydroxy-1-[1-hydroxy-butyl]-cyclohexane,
  2,6,6-trimethyl-1-butyryl-1,2-epoxy-cyclohexane.

Whenever the specific cis- or trans-isomerism is specified, it is deemed to refer to the isomerism of the olefinic double bond in position 2- of the side chain of the molecule.

According to the process of the present invention compounds V (*a,b,c*) are also prepared by epoxidizing the compounds of formula VII (*a,b,c*) and successively treating the thus obtained epoxide with a basic agent. The epoxidation may be carried out by means of an organic peracid of the class generally used to this end such as performic acid, peracetic acid, trifluoroacetic acid, perbenzoic acid, monochloroperbenzoic acid, monoperphthalic acid in an inert organic solvent such as e.g. chloroform, methylene chloride, trichloroethylene or benzene in a buffered medium. An alkali metal acetate may be conveniently used as buffer salt.

The next step of the reaction, i.e., the treatment of the obtained epoxidation products, formally consists in the opening of the epoxide ring to afford compounds V (*a,b,c*). Said ring opening may be carried out by means of a basic agent in accordance with the procedure usually employed to this end in organic chemistry [cf.: D. J. Cram and G. S. Hammond, *Organic Chemistry*, McGraw Hill, Inc., New York (1959), pp. 204–5; H. O. House, *Modern Synthetic Reactions*, W. A. Benjamin, Inc., New York (1965), pp. 112–3]. The lithium salt of ethylenediamine is preferred.

The following reaction scheme will illustrate the above described process:

The epoxide intermediates include a new compound, namely 2,6,6-trimethyl-1-[1-hydroxy-butyl]-1,2-epoxy-cyclohexane.

The compounds of formula VI (*a,b,c*) may equally be prepared by direct epoxidation of the unsaturated cycloaliphatic derivatives of formula

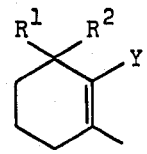

VIII (a,b,c)

in accordance with the process described in German Offenlegungsschrift No. 2,022,216.

The compounds of formula VIII (*a,b,c*) used as starting materials in the above described method may be obtained in accordance with the procedure described in Swiss Pat. No. 498,795 and German Offenlegungsschrift No. 2,022,216. The compounds of formula VIII (*a,b,c*) include a new compound, namely 2,6,6-trimethyl-1-butyryl-cyclohex-1-ene.

As mentioned above a further object of the present invention is to provide a process for the preparation of unsaturated cycloaliphatic ketones of formula

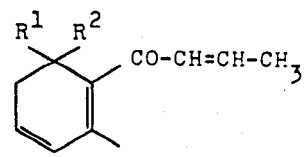

I which process comprises treating a keto-alcohol of formula IIa with an acidic agent.

A mineral or organic acid such as hydrochloric, sulphuric, phosphoric, p-toluenesulphonic or trifluoroacetic acid, or acidic diatomaceous earths may be advantageously used as acidic agents.

The reaction may be carried out in an organic solvent, preferably an inert one, such as benzene, dioxan, tetrahydrofuran or ethyl acetate, or a mixture of at least two of the said solvents, and preferably at a temperature comprised between about 50° C and the boiling temperature of the chosen solvent.

The temperature range indicated above may however vary within wider limits and temperatures higher or lower than those indicated may be used. According to a preferred embodiment of the present process of the invention, the reaction is carried out in a dioxan solution and at a temperature comprised between about 90° and about 100° C. The compounds of formula IIa, used as starting materials for the above mentioned process, together with their analogues of formula II (*b,c*) and III (*a,b,c*) are prepared according to a process of the present invention by oxidizing a diol of formula IV (*a,b,c*) or V (*a,b,c*), respectively.

The said oxidation may be carried out by the action of silver carbonate in the presence of diatomaceous earth, or of an oxygen-containing derivative of a transi-

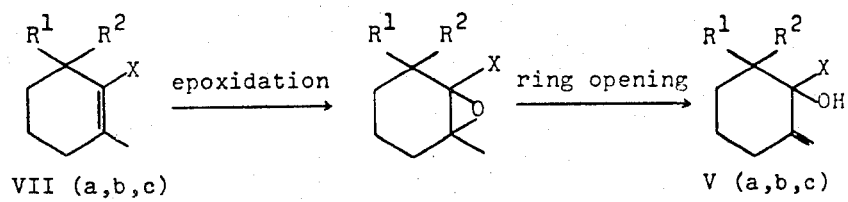

tion metal such as chromium, manganese or nickel. Preferred oxidation agents include manganese dioxide and chromium trioxide, this latter being preferably used in the presence of an organic base such as pyridine [cf. e.g.: *J. Org. Chem.*, 26, 4814 (1961)].

Said oxidation can be carried out in an inert organic solvent such as an aliphatic or cycloaliphatic hydrocarbon, e.g. pentane, hexane or cyclohexane.

According to a specific embodiment of the present process of the invention compounds IIa and IIIa can be obtained by oxidation by means of both manganese dioxide and chromium trioxide in pyridine, whereas compounds IIb and IIIb are preferably obtained by the action on diols IVb and Vb of chromium trioxide in pyridine.

The compounds of formula II (a,b,c) and III (a,b,c) include the following new compounds:

2,6,6-trimethyl-1-hydroxy-1-butyryl-cyclohex-2-ene,
cis- and trans-2-methylene-6,6-dimethyl-1-hydroxy-1-[but-2-enoyl]-cyclohexane,
2-methylene-6,6-dimethyl-1-hydroxy-1-[but-3-enoyl]-cyclohexane and
2-methylene-6,6-dimethyl-1-hydroxy-1-butyryl-cyclohexane.

Compounds IIa can furthermore be obtained by isomerisation of the exocyclic double bond of compounds IIIa by means of an acidic or basic isomerising agent. Said isomerisation is advantageously promoted by a Lewis-type acid such as AlCl$_3$, BF$_3$, SnCl$_4$ or iodine. This latter is preferred. As basic isomerising agent lithium-ethylenediamine can be used instead.

Carbinols VII (a,b,c) can be further converted into their corresponding esters, such as formates, acetates, propionates, butyrates e.g., in accordance with the usual techniques of esterification [cf. e.g.: L. F. Fieser and M. Fieser, Organic Chemistry, Reinhold Publ. Corp., New York (1956), p. 174]. Specifically, by treating carbinols VII (a,b,c) with acetyl chloride in the presence of an organic base such as a tertiary amine, e.g. dimethylaniline, there are obtained with good yields the corresponding acetates of formula

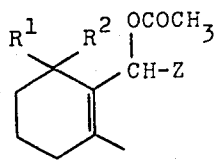

IX (a,b,c)

wherein R$^1$ and R$^2$ have the same meaning as indicated above and the symbol Z represents
a univalent hydrocarbon radical of formula

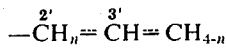

containing a double bond in one of the positions indicated by the dotted lines and n is 1 or 2, or of formula

—CH$_2$—CH$_2$—CH$_3$

The mentioned esters can be converted into their corresponding mono-epoxide derivatives according to the usual procedure of epoxidation [see e.g. the above described epoxidation of compounds VII (a,b,c)]. Specifically, acetates IX (a,b,c) can be epoxidized to yield the compounds of formula

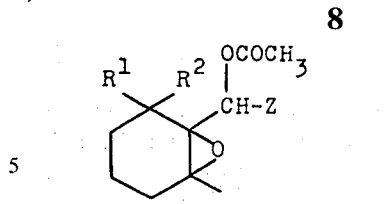

X (a,b,c)

The compounds of the hereinabove given formulae IX (a,b,c) and X (a,b,c) include the following new compounds:

cis- and trans-2,6,6-trimethyl-1-[1-acetoxy-but-3-enyl]-cyclohex-1-ene,
2,6,6-trimethyl-1-[1-acetoxy-but-3-enyl]-cyclohex-1-ene, 2,6,6-trimethyl-1-[1-acetoxy-butyl]-cyclohex-1-ene, cis- and trans-2,6,6-trimethyl-1-[1-acetoxy-but-2-enyl]-1,2-epoxy-cyclohexane,
2,6,6-trimethyl-1-[1-acetoxy-but-3-enyl]-1,2-epoxy-cyclohexane and
2,6,6-trimethyl-1-[1-acetoxy-butyl]-1,2-epoxy-cyclohexane.

In terms of chemical structure, the new compounds of the invention are related to the known compounds disclosed in German Offenlegungsschrift No. 2,022,216 and Swiss Pat. No. 524,320, but their olfactive and flavouring characteristics differ significantly from those of said previously described compounds. This underlines the impossibility of predicting precise organoleptic characteristics from chemical structure. As is well known from other classes of compounds also, the position of a double bond in the molecule, the steric configuration and the nature of the specific substitution, in a higher homologue e.g., can substantially modify the odour and/or flavour of a given substance.

Specifically the new compounds of the invention have an odour reminiscent of certain plants of the family of papilionaceae, in particular of foenugreek. Typically, 2,6,6-trimethyl-1-hydroxy-1-butyryl-cyclohex-2-ene and 2-methylene-6,6-dimethyl-1-hydroxy-1-[1-but-2-enoyl]-cyclohexane develop and enhance the said olfactive note. These two compounds may be used in particular as perfume modifying agents in fine perfumery, specifically for enhancing the natural effect of certain compositions of the flowery type such as jasmin or jasmin-like compositions.

The new compounds of the invention may equally develop various olfactive notes such as woody, amber-like or even, in some instances, fruity notes. Typically, 2-methylene-6,6-dimethyl-1-hydroxy-1-butyryl-cyclohexane, 2,6,6-trimethyl-1-[1-acetoxy-but-3-enyl]-1,2-epoxy-cyclohexane, 2,6,6-trimethyl-1-[1-acetoxy-butyl]-cyclohex-1-ene and 2,6,6-trimethyl-1-[1-hydroxy-butyl]-1,2-epoxy-cyclohexane are reminiscent of patchouli or vetyver oil and can be used for modifying or enhancing the woody notes of certain perfume compositions. It has been observed that the character of 2,6,6-trimethyl-1-[1-hydroxy-butyl]-cyclohex-2-ene, 2,6,6-trimethyl-1-hydroxy-1-butyryl-cyclohexane and 2,6,6-trimethyl-1-[1-acetoxy-but-3-enyl]-cyclohex-1-ene is reminiscent of the scent of certain fruits, particularly of gooseberries. This specific effect is novel and original in the art of modern perfumery. The said compounds satisfy therefore a special need of the perfumers, who in recent years tried to develop new fragrances possessing fruity tones.

The proportions of the new compounds to be used in such compositions can vary within wide limits. For example, in the preparation of perfume compositions, interesting effects can be achieved when the compounds of the invention represent as little as 1% or as much as 5 or 10 % of the total composition; but, depending upon the effect desired, the proportion of the compounds of the invention may be increased to 20 % by weight, or even more.

The new compounds of the invention possess also very interesting flavouring properties. In most instances, they impart to the products to which they are added a woody note. They can moreover develop various flavouring notes such as fruity, fatty or green notes. They find a particularly useful application in the aromatization of foodstuffs such as jam, marmelade, yoghourt, bakery or confectionery products and preserves. In some instances, they may enhance the citrus-fruit characters of beverages such as those having a lemon or sweet-lime character.

The particular organoleptic properties of the new compounds of the invention enable their use for the aromatization of tobacco products, the woody and fruity notes being particularly appreciated by the smokers.

The proportions used for flavouring purposes can vary within a wide range. Typically, interesting flavouring effects can be achieved with amounts ranging from about 0.1 to 10 ppm, based on the weight of the product flavoured. However, in order to obtain special flavour results, this amount can be increased to about 100 ppm.

When the compounds of the invention are used in flavouring compositions, in admixture with other flavouring agents and/or inert carriers or diluents, they may typically comprise from about 0.1 % to about 15 % of the total weight of the composition, and, in many cases, amounts from 1 % to 10 % by weight will give the best results.

In all cases, the ranges of proportions given above may be varied, in order to achieve specific organoleptic effects.

The term "foodstuff", as used in the course of the present specification, is used broadly: it is deemed to designate materials such as coffee, tea and cocoa.

The invention is better illustrated by the following examples, wherein the temperatures are indicated in degrees centigrade.

EXAMPLE 1

A base perfume composition of the "Chypre" type has been prepared by admixing the following ingredients (parts by weight):

| | |
|---|---|
| α-Phenylethylacetate | 30 |
| Undecenal 10 % * | 100 |
| α-Methyldecanal 10 % * | 20 |
| Coumarin | 60 |
| Vanillin | 5 |
| Musk ketone | 55 |
| Cyclopentadecanone 10 % * | 30 |
| α-Isomethylionone | 60 |
| Oak moss absolute | 20 |
| Labdanum absolute | 10 |
| Synth. galbanum | 10 |
| Synth. castoreum | 20 |
| Methyl 2-pentyl-3-oxo-cyclopentyl acetate | 50 |
| Benzyl acetate | 100 |
| Indol 10 % * | 10 |
| Hexylcinnamic aldehyde | 50 |
| Synth. rose | 50 |
| Patchouli | 20 |
| Synth. bergamot | 200 |
| Diethyl phthalate | 100 |
| | 1000 |

* in diethylphthalate

When to 90 g of the above base composition there are added 10 g of a 10 % solution of 2,6,6-trimethyl-1-hydroxy-1-butyryl-cyclohex-2-ene in diethyl phthalate, there is obtained a perfume composition possessing a novel floral tone of a very natural richness.

Analogous results were obtained by adding to the base composition in the same proportions, cis- or trans-2-methylene-6,6-dimethyl-1-hydroxy-1-[but-2-enoyl]-cyclohexane.

EXAMPLE 2

A base perfume composition of the "after-shave lotion" type has been prepared by admixing the following ingredients (parts by weight):

| | |
|---|---|
| Menthol | 10 |
| Eugenol | 50 |
| Coumarin | 20 |
| Muscone 10 % * | 20 |
| Phenylethyl alcohol | 120 |
| Lavender oil | 210 |
| Pimento oil | 40 |
| Cinnamon oil | 5 |
| Synth. bergamot | 270 |
| Cyclopentadecanone 10 % * | 30 |
| Methyl 2-pentyl-3-oxo-cyclopentyl acetate | 20 |
| Oak moss absolute | 15 |
| Benzyl salicylate | 20 |
| Isobutyl salicylate | 30 |
| Geranium Bourbon oil | 70 |
| Musk ketone | 20 |
| 95 % ethanol | 50 |
| | 1000 |

* in 95 % ethanol

When to 95 g of the above composition there are added 5 g of 2-methylene-6,6-dimethyl-1-hydroxy-1-butyryl-cyclohexane there is obtained a new composition possessing, by comparison with the base composition, a pleasant woody note with an amber-like undertone.

Analogous results were obtained by adding to the given base composition in the same proportions, 2,6,6-trimethyl-1-[1-acetoxy-but-3-enyl]-1,2-epoxy-cyclohexane, 2,6,6-trimethyl-1-[1-acetoxy-butyl]-cyclohex-1-ene or 2,6,6-trimethyl-1-[1-hydroxy-butyl]-1,2-epoxy-cyclohexane.

EXAMPLE 3

A base perfume composition has been prepared by admixing the following ingredients (parts by weight):

| | |
|---|---|
| Musk ketone | 10 |
| Dodecenal 10 % * | 20 |
| Undecenal 10 % * | 10 |
| Angelica roots 10 % * | 20 |
| Methyl 2-pentyl-3-oxo-cyclopentyl acetate 10 % * | 50 |
| Ylang | 30 |
| Hydroxycitronellal | 20 |
| Galbanum oil | 10 |
| Coriander oil | 40 |
| Cedar oil | 70 |
| Eugenol | 50 |
| Amyl salicylate | 40 |
| Citronellol | 50 |
| α-Isomethylionone | 50 |
| Citral | 10 |
| Vetyveryl acetate | 20 |
| Lavender oil | 60 |
| Geranium Bourbon | 80 |
| Oak moss absolute 50 % * | 20 |
| Brazilian mint oil | 20 |
| Artificial bergamot | 100 |
| Artificial neroli | 90 |
| Phenylethyl alcohol | 100 |
| Diethylphthalate | 20 |

-Continued

|  | 1000 |
|---|---|

* in diethylphthalate

When to 98 g of the above "after-shave lotion" type base composition there are added 2 g of 2-methylene-6,6-dimethyl-1-hydroxy-1-butyryl-cyclohexane there is obtained a perfume composition possessing, by comparison with the base composition, a pleasant woody, green character.

Analogous results were obtained by adding to the given base composition in the same proportions, 2,6,6-trimethyl-1-[1-acetoxy-but-3-enyl]-1,2-epoxy-cyclohexane, 2,6,6-trimethyl-1-[1-acetoxy-butyl]-cyclohex-1-ene or 2,6,6-trimethyl-1-[1-hydroxy-butyl]-1,2-epoxy-cyclohexane.

EXAMPLE 4

A perfume base composition for lipsticks was prepared by admixing the following ingredients (parts by weight):

| Artificial Jasmin | 150 |
|---|---|
| Phenylethyl alcohol | 100 |
| Artificial rose | 150 |
| Civetone 10 % * | 20 |
| p-Hydroxy-phenyl-butan-3-one 10 % * | 10 |
| Nerol | 100 |
| Heliotropine | 50 |
| Petitgrain bigarade | 50 |
| Methyl-hexylcarbinol | 30 |
| Citronellyl acetate | 60 |
| Ylang | 50 |
| Cyclopentadecanolide 10 % * | 10 |
| Brazilian mint oil | 10 |
| Cinnamon of Ceylon 10 % * | 10 |
| Geranium Bourbon | 40 |
| Linalol | 60 |
| α-Ionone | 50 |
| Diethylphthalate | 50 |
|  | 1000 |

* in diethylphthalate

By adding to 95 g of the hereinabove given base composition 5 g of a 10 % solution of 2,6,6-trimethyl-1-[1-acetoxy-but-3-enyl]-cyclohex-1-ene in diethylphthalate there is obtained a new composition possessing by comparison with the base composition a well defined fruity and sweeter character.

Analogous results were obtained by replacing 2,6,6-trimethyl-1-[1-acetoxy-but-3-enyl]-cyclohex-1-ene by 2,6,6-trimethyl-1-[1-hydroxy-butyl]-cyclohex-1-ene.

EXAMPLE 5

A base perfume composition for room-spray products was prepared by admixing the following ingredients (parts by weight):

| Decanal 10 % * | 50 |
|---|---|
| Nonenal 1 % * | 20 |
| 4-Methyl-2-[2-methyl-propen-2-yl]-tetrahydropyran 10 % * | 10 |
| Geranyl acetate | 30 |
| Geranium Bourbon | 20 |
| Methyl 2-pentyl-3-oxo-cyclopentyl acetate 10 % * | 50 |
| Phenylethyl alcohol | 100 |
| Geranyl nitrile | 10 |
| Geranyl acetone | 20 |
| Linalol | 40 |
| Benzyl acetate | 60 |
| Hexylcinnamic aldehyde | 30 |
| Petitgrain bigarade | 50 |
| Lavender oil | 20 |
| Artificial bergamot | 100 |
| Artificial rose | 70 |

-Continued

| Amyl salicylate | 20 |
|---|---|
| α-Isomethylionone | 50 |
| Cyclopentadecanolide 10 % * | 30 |
| Ylang | 50 |
| Myrcenyl acetate | 70 |
| Diethylphthalate | 100 |
|  | 1000 |

* in diethylphthalate

By adding to 90 g of the above given base perfume composition 10 g of a 10 % solution of 2,6,6-trimethyl-1-[1-hydroxy-butyl]-cyclohex-1-ene in diethylphthalate there is obtained a new composition possessing by comparison with the base composition, an improved natural and fresh fruity character.

EXAMPLE 6

A "Tutti-Frutti" flavouring composition was prepared by admixing the following ingredients (parts by weight):

| Vanillin | 20 |
|---|---|
| Allyl caproate | 10 |
| Citral | 20 |
| Amyl butyrate | 35 |
| Orange oil | 45 |
| Ethyl butyrate | 75 |
| Ethyl acetate | 185 |
| Amyl acetate | 185 |
| Lemon oil | 415 |
|  | 990 |

2,6,6-Trimethyl-1-hydroxy-1-butyryl-cyclohex-2-ene (10 g) was added to 990 g of the above mixture which was then called "test" composition. A "control" composition was prepared by adding 10 g of additional lemon oil to 990 g of the above mixture.

The "test" and "control" compositions were added to the food products described hereinafter in the proportions shown for 100 kg of material to be flavoured.

| Cake | 20 g |
|---|---|
| Pudding | 5 – 10 g |
| Hard Candies | 15 – 20 g |

Hard Candies: 100 ml of sugar syrup (prepared by dissolving 1 kg of sucrose in 600 ml of water) and 20 g of glucose were mixed together and slowly heated to 145°. The flavour was added and the mass was allowed to cool and harden.

Pudding: to 500 ml of warmed milk were added with stirring a mixture of 60 g of sucrose and 3 g of pectin. The mixture was boiled for a few seconds and the flavour was added. The mixture was allowed to cool.

Cake: the following ingredients were mixed together: 100 g of vegetable margarine, 1.5 g of sodium chloride, 100 g of sucrose, 2 eggs and 100 g of flour. The flavour was added and the mass was cooked for 40 minutes at 180°.

The finished foodstuff samples were tested by a panel of trained persons who had to express their views about the flavour of the samples. All members of the panel declared that the "test" samples had a more "round" taste than the "control" and at the same time a woody character. Moreover, the "test" samples presented a fruity note and conferred to the foodstuff materials a character of dried fruit.

When in the above example 2,6,6-trimethyl-1-hydroxy-1-butyryl-cyclohex-2-ene was replaced by 2-methylene-6,6-dimethyl-1-hydroxy-1-butyryl-cyclohexane, analogous results were observed.

EXAMPLE 7

7 g of a 1 % solution of 2,6,6-trimethyl-1-[1-acetoxybut-3-enyl]-cyclohex-1-ene in 95 % ethyl alcohol were sprayed on 100 g of a tobacco mixture of the "american blend" type. The tobacco thus flavoured was used to manufacture "test" cigarettes, the smoke of which was then subjected to organoleptic evaluation by comparison with non-flavoured cigarettes ("control"). The tobacco used to prepared the "control" cigarettes was preliminarily treated with 95 % ethyl alcohol. The panel of experts unanimously defined the taste of the "test" cigarettes as being sweeter than that of the "control" cigarettes; moreover, the smoke possessed a note with an improved woody and fruity character.

By following the same procedure as that given above, 2-methylene-6,6-dimethyl-1-hydroxy-1-[but-2-enoyl]-cyclohexane and 2,6,6-trimethyl-1-hydroxy-1-butyryl-cyclohex-2-ene where evaluated. The smoke of the cigarettes flavoured by these two compounds possessed a woody note of the cedar wood type and was reminiscent of certain woody characters of some oriental tobaccos.

EXAMPLE 8

The vehicle used for testing the flavour compounds was a 65 % solution of cane sugar in tap water. The flavour compounds were incorporated in this sugar syrup in the form of 1 % or 1 per 1,000 by weight solutions in 96 % ethyl alcohol. The concentration of the flavour compounds in the sugar syrup varied between about 0.1 and 1.0 g for 100 liters of syrup according to the varying strength of flavour compounds. Samples of each flavoured sugar syrup were submitted to the members of the tasting panels. After tasting the samples each member had to give an evaluation of each flavour compound in terms of descriptive words. The observed organoleptic evaluations are indicated in the following table.

ing to French Pat. No. 1,591,031] (purity 92 %), 0.2 g of Rose Bengale and 1 g of sodium acetate in 160 ml of anhydrous methanol, through which a stream of pure oxygen is passed, is irradiated in a photochemical reaction vessel at a temperature of about 15° by means of a mercury vapour lamp (type Philips HPK 125 Watt). The absorption of gas at the beginning of the irradiation is 12 ml per minute. This absorption gradually decreases. Towards the end of the irradiation an additional 0.2 g of Rose Bengale is added. After 6 hours the mixture has absorbed 2,850 ml of $O_2$. An analysis by means of vapour phase chromatography reveals that the starting product has practically disappeared.

b. Reduction of the oxidation mixture obtained according to (a)

95 ml of the cooled solution (0°–5°) obtained directly according to the method indicated in the above paragraph a) are added to a mixture of 5 g of $Na_2SO_3$ in 200 ml of water, while vigorously stirring. The whole is left at 40° for 2 hours. The reaction mixture is then extracted several times with ether and the combined organic extracts are washed with water, neutralized with a 5 % solution of $NaHCO_3$ and dried over anhydrous $MgSO_4$. The volatile portions are evaporated under reduced pressure, and the resulting residue is subjected to a distillation to give 9.5 g of an oily product which, on separation by means of preparative vapour phase chromatography, yields the following products:

trans-2,6,6-Trimethyl-1-[but-2-enoyl]-1,2-epoxycyclohexane: yield 48 %; b.p. 80°/0.5 Torr; $n_D^{20}$ = 1,4861; $d_4^{20}$ = 0.9849

IR : 1700–1630 and 968 cm$^{-1}$
NMR : 1.0 and 1.06 (6H, 2s); 1.08 (3H, s); 1.92 (3H, d, J = 7 cps); 6.1–7.2 (2H, m) δ ppm
MS : M$^+$ = 208 (0.1); m/e: 193 (0.1); 151 (5); 139 (12); 125 (14); 111 (64); 95 (5); 82 (12); 69 (100); 55 (80); 41 (62); 29 (8).

threo-2-Methylene-6,6-dimethyl-1-hydroxy-1-[1-hydroxy-but-2-enyl]-cyclohexane: yield 30 %; oil; $n_D^{20}$ = 1.4890; $d_4^{20}$ = 0.9854
IR : 3600, 970 and 890 cm$^{-1}$

TABLE

| Compounds | Organoleptic evaluation |
| --- | --- |
| 1. 2,6,6-Trimethyl-1-[1-acetoxy-but-3-enyl]-1,2-epoxy-cyclohexane | woody, slightly campher-like |
| 2. 2,6,6-Trimethyl-1-[1-hydroxy-butyl]-cyclohex-1-ene | woody, fruity |
| 3. 2,6,6-Trimethyl-1-[1-acetoxy-but-3-enoyl]-cyclohex-1-ene | woody, sweety, fruity |
| 4. 2,6,6-Trimethyl-1-[1-hydroxy-butyl]-1,2-epoxy-cyclohexane | woody, green, minty |
| 5. 2,6,6-Trimethyl-1-[1-acetoxy-butyl]-cyclohex-1-ene | fatty, slightly woody |
| 6. 2-Methylene-6,6-dimethyl-1-hydroxy-1-butyryl-cyclohexane | woody, green, slightly fruity |
| 7. 2,6,6-Trimethyl-1-hydroxy-1-butyryl-cyclohex-2-ene | fruity, dried fruit direction |
| 8. 2-Methylene-6,6-dimethyl-1-hydroxy-1-[but-2-enoyl]-cyclohexane | slightly fruity |
| 9. 2,6,6-Trimethyl-1-butyryl-1,2-epoxy-cyclohexane | woody, earthy |

EXAMPLE 9 a. Oxidation of 2,6,6-trimethyl-1-[1-hydroxy-but-2-enyl]-cyclohex-1-ene

A mixture of 20.5 g of 2,6,6-trimethyl-1-[1-hydroxybut-2-enyl]-cyclohex-1-ene [prepared accord- NMR : 0.86 and 1.0 (6H, 2s); 1.69 (3H, d, J=5 cps); 4.23 (1H, m); 4.82 (2H, m); 5.5 (2H, m) δ ppm
MS : M$^+$ = 210 (0.1); m/e: 192 (1); 177 (0.5); 139 (18); 125 (9); 99 (4); 95 (30); 82 (10); 69 (11); 55 (12); 43 (100); 27 (6).

erythro-2-Methylene-6,6-dimethyl-1-hydroxy-1-[1-hydroxy-but-2-enyl]cyclohexane: yield 6 %; m.p. 86°
IR : 3616, 3550, 970 and 890 cm$^{-1}$
NMR : 0.84 and 0.99 (6H, 2s); 1.65 (3H, d, J = 6 cps); 4.28 (1H, m); 4.72 and 5.0 (2H, 2m); 5.5 (2H, m) δ ppm
MS : M+ = 210 (0.1); m/e: 192 (1); 149 (2); 139 (25); 125 (7); 109 (3); 95 (25); 82 (20); 69 (10); 55 (12); 43 (100); 27 (12).

2,6,6-Trimethyl-1-hydroxy-1-[1-hydroxy-but-2-enyl]-cyclohex-2-ene: yield 4 %.
IR : 3500, 3070, 1635, 850 cm$^{-1}$
MS : M$^+$ = 210 (0).

By oxidation by means of MnO$_2$ there is obtained a compound whose analytical data are identical with those of 2,6,6-trimethyl-1-hydroxy-1-[but-2-enoyl]-cyclohex-2-ene [see Ex. 14].

EXAMPLE 10 a. Oxidation of 2,6,6-trimethyl-1-[1-hydroxy-but-3-enyl]-cyclohex-1-ene

A solution of 19.6 g of 2,6,6-trimethyl-1-[1-hydroxy-but-3-enyl]-cyclohex-1-ene [prepared according to Helv. Chim. Acta, 53, 541 (1970)], 0.2 g of Rose Bengale and 0.5 g of sodium acetate in 150 ml of anhydrous methanol is subjected to an oxidation by the action of oxygen in the singlet state following the same process as that described in Example 9. After 7 hours the mixture has absorbed 2,580 ml of O$_2$ at a rate of absorption of 10 ml per minute at the beginning of the irradiation.

b. The mixture obtained by the oxidation by means of oxygen in the singlet state according to the method described in Example 9, paragraph (b), is subjected to a reduction using 10 g of Na$_2$SO$_3$ in 100 ml of water. After 3 hours at about 20°, the reaction mixture is extracted with ether and the combined organic extracts are subjected to the usual treatments to yield a product of b.p. 40°–120°/0.02 Torr, 17.6 g. On separation by means of preparative vapour phase chromatography the following products are obtained:

2,6,6-Trimethyl-1-[but-3-enoyl]-1,2-epoxy-cyclohexane: yield 42 %; $n_D^{20}$ = 1.4721; $d_4^{20}$ = 0.9781
IR : 3080, 1700, 1640, 990 and 915 cm$^{-1}$
NMR : 1.02 and 1.05 (6H, 2s); 1.1 (3H, s); 3.2 (2H, m); 4.8 and 6.2 (3H) δ ppm
MS : M$^+$ = 200 (0.1); m/e: 193 (1); 177 (1); 151 (15); 135 (2); 123 (8); 111 (4); 95 (3); 81 (2); 69 (100); 55 (18); 41 (29).

threo-2-Methylene-6,6-dimethyl-1-hydroxy-1-[1-hydroxy-but-2-enyl]-cyclohexane: yield 25 %; $n_D^{20}$ = 1.5049; $d_4^{20}$ = 1.007
IR : 3623, 3572, 3085, 1645, 1640 and 890 cm$^{-1}$
NMR : 0.86 and 1.08 (6H, 2s); 3.7 (1H, m); 4.7–6.1 (3H); 4.82 and 5.0 (2H, 2m) δ ppm
MS : M$^+$ = 210 (0.1); m/e: 192 (1); 169 (3); 151 (2); 140 (25); 125 (27); 107 (5); 95 (38); 81 (10); 69 (15); 55 (12); 43 (100); 27 (8).

erythro-2-Methylene-6,6-dimethyl-1-hydroxy-1-[1-hydroxy-but-2-enyl]-cyclohexane: yield 8 %; $n_D^{20}$ = 1.5029; $d_4^{20}$ = 0.9954
IR : 3620, 3565, 3080, 1645, 1640, 990, 910 cm$^{-1}$
NMR : 0.88 and 1.05 (6H, 2s); 4.02 (1H, m); 4.8–6.2 (3H); 4.86 and 5.02 (2H, 2m) δ ppm
MS : M+ = 210 (0.1); m/e: 192 (1); 169 (12); 151 (3); 140 (15); 133 (15); 125 (18); 109 (8); 95 (40); 81 (15); 69 (33); 55 (20); 43 (100); 27 (8).

2,6,6-Trimethyl-1-hydroxy-1-[1-hydroxy-but-3-enyl]-cyclohex-2-ene: yield 3 %. By oxidation of this compound with CrO$_3$/pyridine there is obtained 2,6,6-trimethyl-1-hydroxy-1-[but-3-enoyl]-cyclohex-2-ene [see Ex. 14].

EXAMPLE 11 a. Oxidation of 2,6,6-trimethyl-1-[1-hydroxy-butyl]-cyclohex-1-ene

A solution of 19.8 g of 2,6,6-trimethyl-1-[1-hydroxy-butyl]-cyclohex-1-ene (prepared by partial hydrogenation of 2,6,6-trimethyl-1-[1-hydroxy-but-3-enyl]-cyclohex-1-ene in the presence of Raney nickel; $n_D^{20}$ = 1.4891; $d_4^{20}$ = 0.9285), 0.2 g of Rose Bengale and 0.5 g of anhydrous sodium acetate in 160 ml of anhydrous methanol is subjected to an oxidation by the action of oxygen in the singlet state (sensitized photooxygenation) according to the process described in Example 9. The rate of absorption is 9 ml of O$_2$ per minute.

b. The mixture obtained by the oxidation by means of oxygen in the singlet state following the method described in Example 9, paragraph (b), is subjected to a reduction using 10 g of Na$_2$SO$_3$ in 200 ml of water. After 3 hours at about 20° the reaction mixture is extracted with ether and the combined organic extracts are subjected to the usual treatments to yield a product of b.p. 40°–120°/0.01 Torr; 18 g. On separation by means of vapour phase chromatography there are obtained:

2,6,6-Trimethyl-1-butyryl-1,2-epoxy-cyclohexane: yield 50 %; $n_D^2$ = 1.4619; $d_4^{20}$ = 0.9618
IR : 1710 cm$^{-1}$
NMR : 1.02 and 1.04 (6H, 2s); 1.08 (3H, s) δ ppm
MS : M$^+$ = 210 (0.1); m/e: 203 (0.5); 167 (3); 153 (3); 140 (3); 125 (46); 111 (22); 95 (7); 84 (13); 69 (44); 55 (43); 43 (100 ); 27 (10).

threo-2-Methylene-6,6-dimethyl-1-hydroxy-1-[1-hydroxy-butyl]-cyclohexane: yield 27 %; m.p. 64°
IR : 3623, 3565, 3080, 1640 and 895 cm$^{-1}$
NMR : 0.87 and 1.08 (6H, 2s); 3.87 (1H, m); 4.75 (2H, m) δ ppm
MS : M$^+$ = 212 (1); m/e: 194 (1); 179 (1); 151 (3); 140 (33); 125 (50); 109 (7); 95 (35); 84 (12); 69 (18); 55 (25 ); 43 (100); 29 (10).

erythro-2-Methylene-6,6-dimethyl-1-hydroxy-1-[1-hydroxy-butyl]-cyclohexane: yield 4 %; m.p. 56°
IR : 3629, 3558, 3085, 1645 and 898 cm$^{-1}$
NMR : 0.84 and 1.01 (6H, 2s); 3.88 (1H, m); 4.72 and 5.0 (2H, 2m) δ ppm
MS : M$^+$ = 212 (1); m/e: 194 (1); 165 (3); 151 (7); 140 (30); 125 (45); 95 (40); 84 (10); 69 (26); 55 (33); 43 (100); 29 (10).

2,6,6-Trimethyl-1-hydroxy-1-[1-hydroxy-butyl]-cyclohex-2-ene: yield about 5 %. By oxidation of this compound by means of CrO$_3$/pyridine there is obtained 2,6,6-trimethyl-1-hydroxy-1-butyryl-cyclohex-2-ene [see Ex. 14].

EXAMPLE 12

Preparation of 2,6,6-trimethyl-1-[1-hydroxy-but-2- enyl]-; 2,6,6-trimethyl-1-[1-hydroxy-but-3-enyl]- and 2,6,6-trimethyl-1-[1-hydroxy-butyl]-1,2-epoxy-cyclohexane A solution of 0.1 mole of 2,6,6-trimethyl-1-[1-hydroxybut-2-enyl]-cyclohex-1-ene and 12 g of anhydrous sodium acetate in 30 ml of $CH_2Cl_2$ at 15° is added to 21 g of a 40 % solution of peracetic acid and 0.5 g of sodium acetate. The whole is allowed to stand for 3 hours, then the mixture is successively washed with water, a diluted $NaHCO_3$ solution and again with water until neutrality. The separated organic phase is then concentrated and the resulting residue distilled. On separation by means of vapour phase chromatography (CARBOWAX column) the diastereoisomers are obtained in a pure state:

2,6,6-Trimethyl-1-[1-hydroxy-but-2-enyl]-1,2-epoxycyclohexane:yield 80 %; $n_D^{20} = 1.4814$; $d_4^{20} = 0.9933$
IR : 3616, 3552, 965 $cm^{-1}$
NMR : 1.02 (2H, 2s); 1.34 (3H, s); 1.7 (3H, d, J = 5 cps); 2.7 (1H, m); 4.36 (1H, m); 5.55 (2H, m) δ ppm
MS : $M^+= 210$ (0.1); m/e: 168 (1); 149 (10); 140 (39); 125 (93); 109 (16); 95 (14); 84 (24); 69 (49); 55 (50); 43 (100); 29 (14).

By replacing in the above described process 2,6,6-trimethyl-1-[1-hydroxy-but-2-enyl]-cyclohex-1-ene by 2,6,6-trimethyl-1-[1-hydroxy-but-3-enyl]-cyclohex-1-ene there are obtained:

threo-2,6,6-Trimethyl-1-[1-hydroxy-but-3-enyl]-1,2-epoxycyclohexane:yield 16 %; $n_D^{20} = 1.4839$; $d_4^{20} = 0.9945$
IR : 3623, 3510, 3080, 1635, 990 and 910 $cm^{-1}$
NMR : 1.0 and 1.18 (6H, 2s); 1.33 (3H, s); 3.0 (1H, m); 3.9 (1H, m); 4.8–6.2 (3H) δ ppm
MS : $M^+ = 210$ (0.1); m/e: 192 (0.1); 169 (1); 149 (3); 140 (2); 119 (60); 109 (34); 95 (13); 83 (25); 69 (47); 55 (42); 43 (100); 27 (13).

erythro-2,6,6-Trimethyl-1-[1-hydroxy-but-3-enyl]-1,2-epoxycyclohexane:yield 81 %; $n_D^{20} = 1.4781$; $d_4^{20} = 0.9772$
IR : 3510, 3080, 1640, 990, 910 $cm^{-1}$
NMR : 1.0 and 1.02 (6H, 2s); 1.43 (3H, s); 3.91 (1H, t, J = 6 cps); 4.8 –6.2 (3H) δ ppm
MS : $M^+ = 210$ (0.1); m/e: 192 (0.1); 169 (2); 149 (5); 140 (3); 125 (22); 109 (28); 95 (12); 83 (23); 69 (40); 55 (37); 43 (100 ); 27 (12).

By replacing in the above described process 2,6,6-trimethyl-1-[1-hydroxy-but-2-enyl]-cyclohex-1-ene by 2,6,6-trimethyl-1-[1-hydroxy-butyl]-cyclohex-1-ene there are obtained:

threo-2,6,6-Trimethyl-1-[1-hydroxy-butyl]-1,2-epoxy-cyclohexane:yield 10 %; $n_D^{20} = 1.4760$; $d_4^{20} = 0.9819$
IR : 3637, 3510 $cm^{-1}$
NMR : 1.04 and 1.18 (6H, 2s); 0.98 (3H, t, J = 6 cps); 1.33 (3H, s); 3.46 (1H, m); 3.9 (1H, m) δ ppm
MS :-Trimethyl-(0.1); m/e: 183 (1); 165 (3); 151 (5); 140 (4); 128 (45); 109 (12); 95 (10); 85 (30); 71 (40); 55 (50); 43 (100); 29 (15).

erythro-2,6,6-Trimethyl-1-[1-hydroxy-butyl]-1,2-epoxy-cyclohexane:yield 86 %; $n_D^{20}$ 32 1.4687; $d_4^{20} = 0.9705$
IR : 3510 $cm^{-1}$ NMR : 1.0 (6H, 2s); 0.96 (3H, t, J=6 cps); 1.4 (3H, s); 2.55 (1H, m); 3.72 (1H, m) δ ppm
MS : $M^+ = 212$ (0.1); m/e: 183 (1); 165 (3); 151 (7); 140 (3); 128 (42); 109 (15); 95 (12); 85 (20); 71 (35); 55 (40); 43 (100); 29 (15).

EXAMPLE 13

Preparation of 2,6,6-trimethyl-1-[1-acetoxy-but-3-enyl]-, 2,6,6-trimethyl-1-[1-acetoxy-but-2-enyl]- and 2,6,6-trimethyl-1-[1-acetoxy-butyl]-1,2-epoxy-cyclohexane The 2,6,6-trimethyl-1-[1-acetoxy-but-3-enyl]- and 2,6,6-trimethyl-1-[1-acetoxy-butyl]-cyclohex-1-ene used as starting products for the following epoxidation reaction are prepared by treating the corresponding carbinols with acetyl chloride in the presence of dimethylaniline according to the usual methods (see for example: R. B. Wagner and H. D. Zook, "Synthetic Organic Chemistry," John Wiley, Inc., New York, p. 481 (1956)).

2,6,6-Trimethyl-1-[1-acetoxy-but-3-enyl]-cyclohex-1-ene: B.p. 63°/0.1 Torr; $n_D^{20} = 1.4720$; $d_4^{20} = 0.9401$
IR : 1740 $cm^{-1}$ 2,6,6-Trimethyl-1-[1-acetoxy-butyl]-cyclohex-1-ene: B.p. 65°/0.1 Torr; $n_D^{20} = 1.4810$; $d_4^{20} = 0.9521$
IR : 1738 $cm^{-1}$ 2,6,6-Trimethyl-1-[1-acetoxy-but-2-enyl]-cyclohex-1-ene: B.p. 62°/0.1 Torr; $d_4^{20} = 0.9455$; IR : 1740 $cm^{-1}$ The preparation of the corresponding epoxides is carried out as indicated in Example 12. The analytical characteristics of the obtained compounds are given below:

threo-2,6,6-Trimethyl-1-[1-acetoxy-but-3-enyl]-1,2-epoxy-cyclohexane:yield 59 %; m.p. 37°–38°
IR : 1745 $cm^{-1}$
NMR : 1.08 (6H, 2s); 1.38 (3H, s); 1.92 (3H, s); 5.1 (1H, m); 4.8–6.2 (3H) δ ppm.

erythro-2,6,6-Trimethyl-1-[1-acetoxy-but-3-enyl]-1,2-epoxycyclohexane:yield 41 %; $n_D^{20} = 1.4685$; $d_4^{20} = 1.009$
IR : 3080, 1740 $cm^{-1}$, 1638, 990 and 910 $cm^{-1}$
NMR : 0.98 and 1.02 (6H, 2s); 1.38 (3H, s); 1.93 (3H, s); 4.8–6.2 (3H); 4.96 (1H, m) δ ppm threo-2,6,6-TRimethyl-1-[1-acetoxy-butyl]-1,2-epoxy-cyclohexane: yield 66 %; $n_D^{20} = 1.4653$; $d_4^{20} = 0.9959$
IR : 1745 $cm^{-1}$
NMR : 0.97 and 1.03 (6H, 2s); 0.96 (3H, t, J = 6 cps); 1.37 (3H, s); 1.97 (3H, s); 5.37 (1H, m) δ ppm erytro-2,6,6-Trimethyl-1-[1-acetoxy-butyl]-1,2-epoxy-cyclohexane: yield 34 %; $n_D^{20} = 1.4631$; $d_4^{20} = 1.000$
IR : 1745 $cm^{-1}$
NMR: 1.08 (6H, 2s); 1.36 (3H, s); 1.94 (3H, s); 5.0 (1H, m) δ ppm threo-2,6,6-Trimethyl-1-[1-acetoxy-but-2-enyl]-1,2-epoxy-cyclohexane:yield 52 %;
IR : 1742 $cm^{-1}$
MS : $M^+ = 252$ erythro-2,6,6-Trimethyl-1-[1-acetoxy-but-2-enyl]-1,2-epoxy-cyclohexane:yield 47 %;
IR : 1738 cm$^{-1}$
MS : M$^+$ = 252

EXAMPLE 14

Preparation of 2-methylene-6,6-dimethyl-1-hydroxy-1-[but-2-enoyl]-cyclohexane and 2,6,6-trimethyl-1-hydroxy-1-[but-2-enoyl]-cyclohex-2-ene; 2-Methylene-6,6-dimethyl-1-hydroxy-1-[but-3-enoyl]-cyclohexane and 2,6,6-trimethyl-1-hydroxy-1-[but-3-enoyl]-cyclohex-2-ene; 2-Methylene-6,6-dimethyl-1-hydroxy-1-butyryl-cyclohexane and 2,6,6-trimethyl-1-hydroxy-1-butyryl-cyclohex-2-ene 7.2 g of the products directly obtained by a sensitized photooxygenation of 2,6,6-trimethyl-1-[1-hydroxy-but-2-enyl]-cyclohex-1-ene followed by a reduction by means of Na$_2$So$_3$ according to the process described in Example 9 are mixed within 24 hours, while vogorously stirring, with 40 g of freshly activated MnO$_2$ in 200 ml of petroleum ether, in a nitrogen atmosphere. After separation by filtration of the excess MnO$_2$ and distillation of the clear filtrate there are obtained 6.1 g of a mixture comprising the desired products. The separation is effected by means of vapour phase chromatography.

2-Methylene-6,6-dimethyl-1-hydroxy-1-[but-2-enoyl]-cyclohexane:M.p. 70°–71°
IR : 3500, 1810, 1690 and 885 cm$^{-1}$
NMR : 0.88 and 0.98 (6H, 2s); 1.86 (3H, d, J = 5 cps); 3.22 (1H, m); 4.94 and 5.13 (2H, 2m); 6.79 (1H, m) δ ppm
MS : M$^+$ = 208 (6); m/e: 193 (3); 175 (0.1 ); 165 (0.1); 152 (0.1); 139 (22); 123 (0.3); 111 (0.5); 95 (40); 81 (1); 69 (25); 55 (9); 43 (100); 27 (2).

2,6,6-Trimethyl-1-hydroxy-1-[but-2-enoyl]-cyclohex-2-ene: $n_D^{20}$ = 1.5049; $d_4^{20}$ = 1.018
IR : 3090, 1675, 1620, 970 cm$^{-1}$
NMR : 0.72 and 0.94 (6H, 2s); 1.45 (3H, m); 1.92 (3H, d, J = 7.5 cps); 4.07 (1H, m); 5.7 (1H, m); 6.35–7.2 (m) δ ppm
MS : M$^+$ = 208 (0.1); m/e: 190 (0.1); 175 (0.1); 152 (0.1); 139 (49); 121 (3); 109 (2); 95 (33); 69 (28); 55 (7); 43 (100); 27 (5).

2,6,6-Trimethyl-1-hydroxy-1-[but-3-enoyl]-cyclohex-2-ene: B.p. 50°/0.01 Torr; $n_D^{20}$ = 1.4960; $d_4^{20}$ = 0.9392
IR : 3470, 1740 cm$^{-1}$
NMR : 0.87 and 1.08 (6H, 2s); 1.98 (3H, d, J = 7 cps); 4.7–6.1 (3H, m) δ ppm 2-Methylene-6,6-dimethyl-1-hydroxy-1-[but-3-enoyl]-cyclohexane: IR : 3500, 1740, 1640, 990 cm$^{-1}$
NMR : 0.88 and 1.05 (6H, 2s); 4.7–6.1 (3H, m); 4.86 and 5.02 (2H, 2m) δ ppm 2,6,6-Trimethyl-1-hydroxy-1-butyryl-cyclohex-2-ene:
IR : 3450 and 1735 cm$^{-1}$
NMR : 0.85 and 1.07 (6H, 2s); 0.98 (3H, t, J = 6 cps); 1.98 (3H, d, J = 7 cps) δ ppm 2-Methylene-6,6-dimethyl-1-hydroxy-1-butyryl-cyclohexane:
IR : 3500 and 1735 cm$^{-1}$ NMR : 0.88 and 1.07 (6H, 2s); 0.98 (3H, t, J=6 cps); 4.86 and 5.05 (2H, 2m) δ ppm.

EXAMPLE 15

Preparation of 2,6,6-trimethyl-1-[but-2-enoyl]-cyclohexa-1,3-diene 6 g of the mixture of keto-alcohols obtained according to the method described in Example 14 are mixed with 1.5 g of acidic diatomaceous earth in 30 ml of dioxane. The whole is heated for 3 hours at 105°. Distillation of the reaction mixture gives the desired ketone in a yield of 85 %. The analytical data are identical with those of a pure sample prepared according to Helv. Chim. Acta, 53, 541 (1970).

EXAMPLE 16

Isomerization of 2-methylene-6,6-dimethyl-1-hydroxy-1-[but-2-enoyl]-cyclohexane into 2,6,6-trimethyl-1-hydroxy-1-[but-2-enoyl]-cyclohex-2-ene 5 g of 2-methylene-6,6-dimethyl-1-hydroxy-1-[but-2-enoyl]-cyclohexane, prepared according to the process described in Example 14, are refluxed in a nitrogen atmosphere in 30 ml of toluene with 0.5 g of iodine. After 4 hours the reaction mixture is cooled and treated with a concentrated aqueous Na$_2$SO$_3$ solution until complete reduction of the excess iodine. After separation, the organic phase is washed with water, dried over MgSO$_4$ and concentrated. Distillation of the thus obtained residue gives 4 g of a mixture comprising 30 % of 2,6,6-trimethyl-1-hydroxy-1-[but-2-enoyl]-cyclohex-2-ene.

EXAMPLE 17

2-Methylene-6,6-dimethyl-1-hydroxy-1-[1-hydroxy-but-2-enyl]-cyclohexane a. 21 g of 40 % peracetic acid in H$_2$O and 0.6 g of sodium acetate were added to a suspension of 19.4 g of 2,6,6-trimethyl-1-[1-hydroxy-but-2-enyl]-cyclohex-1-ene and 12 g of sodium acetate in 35 ml of CH$_2$Cl$_2$ at 20° under nitrogen atmosphere. The whole was left for 2 hours at room temperature and whereupon 250 ml of H$_2$O were added therein.

The organic phase gave by distillation 19.5 g (93 % yield) of 2,6,6-trimethyl-1-[1-hydroxy-but-2-enyl]-1,2-epoxy-cyclohexane; b.p. 84°/0.4 Torr; $n_D^{20}$ = 1.4814; $d_4^{20}$ = 0.9933.

b. To 50 ml of a 1N solution of lithium metal in ethylenediamine there were added under stirring in nitrogen atmosphere 10.5 g of the epoxide prepared according to the procedure described above. The reaction mixture was maintained at ca. 100° during 30 minutes, whereupon the excess of ethylenediamine was evaporated under reduced pressure. After neutralization by means of diluted acetic acid and subsequent fractional distillation there were obtained 2.35 g (22 % yield) of an isomer mixture of 2-methylene-6,6-dimethyl-1-hydroxy-1-[1-hydroxy-but-2-enyl]-cyclohexane, the analytical data of which were in all respects identical with those of a sample prepared in accordance with the procedure described in Example 9.

When 2,6,6-trimethyl-1-[1-hydroxy-but-2-enyl]-cyclohex-1-ene was replaced by 2,6,6-trimethyl-1-[1-hydroxy-but-3-enyl]-cyclohex-1-ene or 2,6,6-trimethyl-1-[1-hydroxy-butyl]-cyclohex-1-ene there were obtained, by applying the same procedure as given above, the corresponding diol derivatives.

I claim:

1. A process for the preparation of unsaturated cycloaliphatic ketones of formula

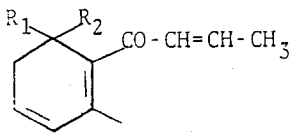

wherein $R_1$ and $R_2$ are the same or different and each represents a hydrogen atom or a lower alkyl radical comprising from one to six carbon atoms, which comprises treating a keto-alcohol of formula

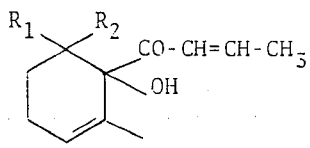

with an acid of the group comprising hydrochloric acid, sulphuric acid, phosphoric acid, p-toluenesulphonic acid, trifluoroacetic acid and acidic diatomaceous earth wherein the reaction is carried out in an inert organic solvent and at a temperature between about 50°C. and about the boiling temperature of the chosen solvent.

2. A process according to claim 1, wherein the reaction is carried out in dioxan and at a temperature between about 90° and 100° C.

* * * * *

UNITED STATES PATENT AND TRADEMARK OFFICE
CERTIFICATE OF CORRECTION

PATENT NO. : 3,892,809
DATED : July 1, 1975
INVENTOR(S) : KARL-HEINRICH SCHULTE-ELTE It is certified that error appears in the above-identified patent and that said Letters Patent are hereby corrected as shown below:

Column 4, line 64 "comprises" should read --comprised--.

Column 13, line 15 "prepared" should read --prepare--.

Column 14, line 34 "1630" should read --1620--.

Column 15, line 6 "&" should read --$\delta$--.

Column 15, line 41 "0.02 Torr" should read --0.01 Torr--.

Column 16, line 36 "$n_D^2$" should read --$n_D^{20}$--.

Column 17, line 61 "-Trimethyl" should read --212--.

Column 17, line 66 "32" should read --=--.

Column 18, line 51 "TRimethyl" should read --Trimethyl--.

Column 18, line 58 "erytro" should read --erythro--.

Column 19, line 10 "Methylene" should read --2-Methylene--.

Signed and Sealed this thirteenth Day of April 1976

[SEAL]

Attest:

RUTH C. MASON
Attesting Officer

C. MARSHALL DANN
Commissioner of Patents and Trademarks